(12) United States Patent
Johnson et al.

(10) Patent No.: US 7,204,162 B2
(45) Date of Patent: Apr. 17, 2007

(54) CAPACITIVE STRAIN GAUGE

(75) Inventors: Jack D. Johnson, Russiaville, IN (US);
Seyed R. Zarabadi, Kokomo, IN (US);
Ian D. Jay, Logansport, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/995,779

(22) Filed: Nov. 23, 2004

(65) Prior Publication Data

US 2006/0107768 A1 May 25, 2006

(51) Int. Cl.
*G01L 1/04* (2006.01)
*G01L 1/22* (2006.01)

(52) U.S. Cl. .................................. 73/862.628
(58) Field of Classification Search ................. 73/862, 73/628
See application file for complete search history.

(56) References Cited

U.S. PATENT DOCUMENTS

| | | | | |
|---|---|---|---|---|
| 3,808,480 A | * | 4/1974 | Johnston ................... | 361/283.4 |
| 4,030,347 A | * | 6/1977 | Norris et al. ................. | 73/769 |
| 4,177,421 A | * | 12/1979 | Thornburg .................. | 324/725 |
| 4,177,680 A | * | 12/1979 | Coleman ..................... | 73/718 |
| 4,203,327 A | | 5/1980 | Singh .......................... | 73/721 |
| 4,222,815 A | | 9/1980 | Krechmery ................. | 156/630 |
| 4,426,673 A | * | 1/1984 | Bell et al. ................. | 361/283.4 |
| 4,523,474 A | * | 6/1985 | Browne et al. ............... | 73/724 |
| 4,716,492 A | * | 12/1987 | Charboneau et al. .... | 361/283.4 |
| 4,896,098 A | * | 1/1990 | Haritonidis et al. ........ | 324/663 |
| 4,944,181 A | * | 7/1990 | Wnuk .......................... | 73/780 |
| 5,261,999 A | | 11/1993 | Pinker et al. ................ | 156/630 |
| 5,932,809 A | | 8/1999 | Sparks et al. .................. | 73/727 |
| 6,107,861 A | | 8/2000 | Mayer ......................... | 327/513 |
| 6,154,475 A | | 11/2000 | Soref et al. .................... | 372/45 |
| 6,257,062 B1 | * | 7/2001 | Rich ........................ | 73/514.32 |
| 6,393,914 B1 | * | 5/2002 | Zarabadi et al. ......... | 73/514.04 |
| 6,428,713 B1 | | 8/2002 | Christenson et al. .......... | 216/2 |
| 6,444,487 B1 | | 9/2002 | Boggs et al. ................. | 438/48 |
| 6,505,516 B1 | * | 1/2003 | Frick et al. ................... | 73/718 |
| 6,532,824 B1 | * | 3/2003 | Ueno et al. ................... | 73/780 |
| 6,635,910 B1 | | 10/2003 | Gross ......................... | 257/254 |
| 6,682,965 B1 | | 1/2004 | Noguchi et al. ............. | 438/199 |
| 6,707,106 B1 | | 3/2004 | Wristers et al. ............. | 257/347 |
| 6,718,826 B2 | * | 4/2004 | Zarabadi et al. ......... | 73/514.38 |
| 6,761,070 B2 | | 7/2004 | Zarabadi et al. ............. | 73/514 |
| 6,826,968 B2 | * | 12/2004 | Manaresi et al. ...... | 73/862.046 |
| 6,918,282 B2 | * | 7/2005 | Zarabadi ..................... | 73/1.38 |

OTHER PUBLICATIONS

Nagy, Michael L., Apanius, Christopher, and Siekkinen, James W., "A User-Friendly, High-Sensitivity Strain Gauge," www.sensormag.com, Sensors—Jun. 2001, 7 pages.

* cited by examiner

*Primary Examiner*—Edward Lefkowitz
*Assistant Examiner*—Octavia Davis
(74) *Attorney, Agent, or Firm*—Jimmy L. Funke

(57) ABSTRACT

A strain gauge for sensing strain is provided and includes a support substrate, and first and second electrodes supported on the substrate. The first and second electrodes include first and second capacitive plates, respectively. The first capacitive plates are movable relative to the second capacitive plates responsive to strain. The strain gauge further has an input electrically coupled to one of the first and second electrodes for receiving an input signal, and an output electrically coupled to the other of the first and second electrodes for providing an output signal which varies as a function of the capacitive coupling and is indicative of sensed strain.

18 Claims, 7 Drawing Sheets

CAPACITIVE STRAIN GAUGE

TECHNICAL FIELD

The present invention generally relates to sensing devices and, more particularly, relates to a microfabricated strain gauge for sensing strain applied to a substrate.

BACKGROUND OF THE INVENTION

Strain gauges are generally employed to sense strain, such as that caused by tension and compressive forces, applied to a member substrate. Conventional strain gauges typically employ a strain sensing element adhered to a surface of the member substrate such that when the member substrate is strained, the resistance of the sensing element changes in proportion to the sensed strain. The measured strain is generally calculated based on the change in resistance in the sensing element as the member substrate is compressed or elongated due to the strain.

Some conventional strain gauges employ a metal foil element that changes resistance as the surface of the member deflects. Such strain gauges typically require discrete components that are difficult to install and require substantial external electronics to obtain an adequate signal. Additionally, the metal foil-type sensing elements typically consume a substantial amount of continuous electrical power.

The discrete sensing element employed in the strain gauge typically must be carefully adhered to the surface of the member substrate. Additionally, the sensing element is typically connected to a Wheatstone bridge circuit which converts the sensed resistance to a voltage signal. To obtain the voltage signal, it is generally required to further connect a differential amplifier and a current source to the Wheatstone bridge circuit.

Other conventional strain gauges employ a piezoresistive single crystal silicon strain gauge having a flexible polyimide backing. One example of such a piezoresistive strain gauge developed by BF Goodrich Advanced Micro Machines is identified as LN-100. The aforementioned piezoresistive strain gauge is manufactured of silicon; however, it likewise generally requires careful attachment of piezoresistive sensing element and a Wheatstone bridge circuit configuration to obtain the voltage signal.

While the aforementioned conventional strain gauges have served adequately well in the past to sense forced strain, a number of drawbacks exist. Many conventional strain gauges require added external electronics which generally consume a significant amount of space, require increased electrical power, and add to the cost of the strain gauge.

Accordingly, it is therefore desirable to provide for a strain gauge that may be easily attached onto a member substrate that does not suffer the aforementioned drawbacks. In particular, it is desirable to provide a strain gauge that generates a voltage output signal indicative of the sensed strain, without requiring bulky and costly external electronics.

SUMMARY OF THE INVENTION in accordance with the teachings of the present invention, a strain gauge is provided for sensing strain. The strain gauge includes a support substrate, a first electrode supported on the substrate and having one or more first capacitive plates and a second electrode supported on the substrate and having one or more second capacitive plates arranged to provide a capacitive coupling with the one or more first capacitive plates. The first capacitive plates are movable relative to the second capacitive plates in response to strain. The strain gauge further has an input electrically coupled to one of the first and second electrodes for receiving an input signal, and an output electrically coupled to the other of the first and second electrodes for providing an output signal which varies as a function of the capacitive coupling and is indicative of the sensed strain.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
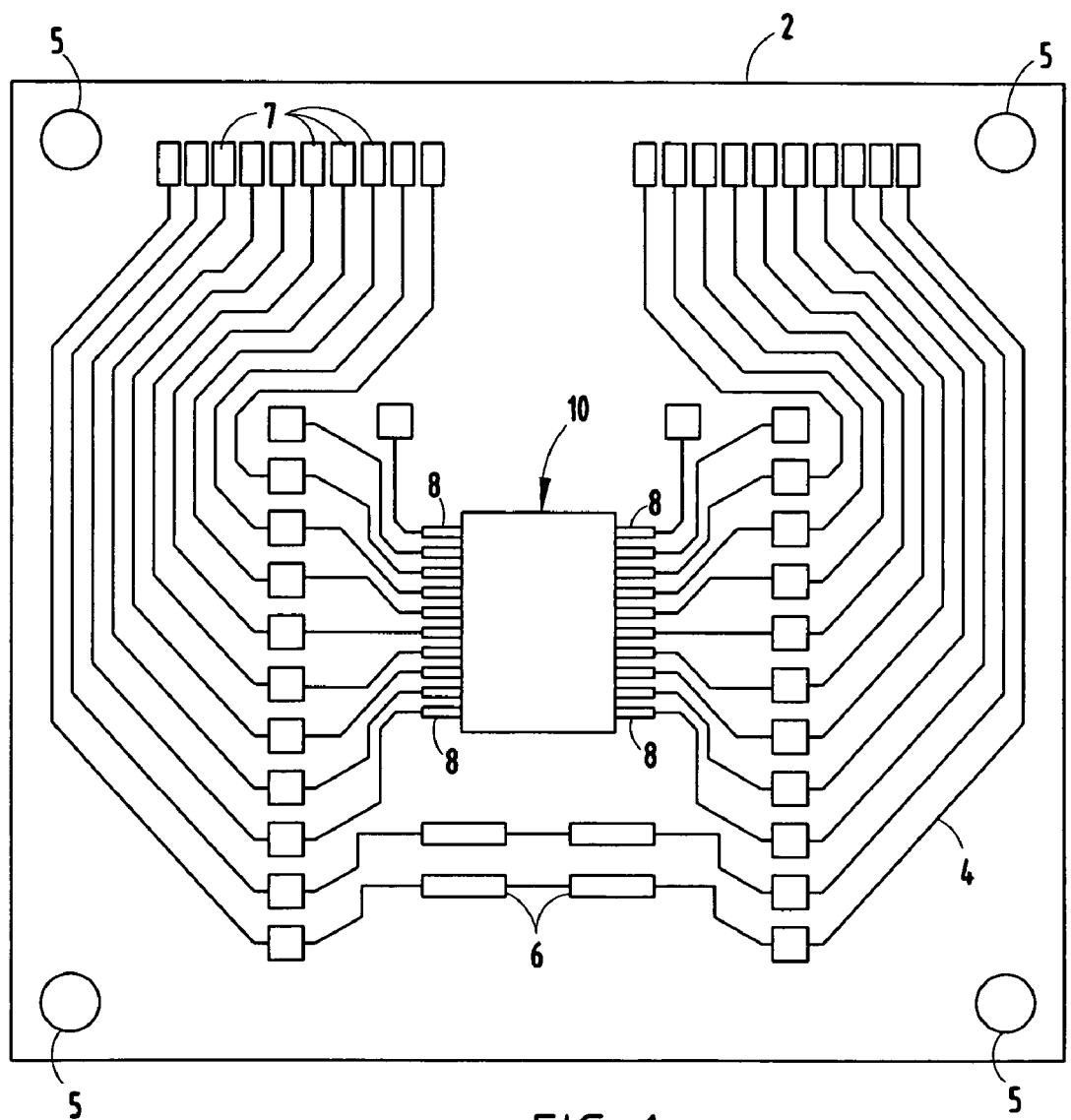
FIG. 1 is a top view of a strain gauge mounted on a printed circuit board, according to one example.

Referring to FIG. 1, a strain gauge 10 is generally illustrated mounted on a printed circuit board 2 for sensing strain applied to the printed circuit board 2, according to one example. The printed circuit board 2 generally includes printed circuitry 4 and various electronic components 6 as should be evident to those skilled in the art. The strain gauge 10 is mounted inside a standard integrated circuit package such as an overmolded small outline integrated circuit (SOIC) package and attached to the printed circuit board 2 at package pins 8 via solder or other rigid connection, such as conductive epoxy, to transfer the mechanical forces and transmit electrical signals.

In the example shown, the strain gauge 10 is mounted onto a surface of the printed circuit board 2 to measure strain applied to the circuit board 2 which may result in forced bending (e.g., torque). By knowing the strain applied to the circuit board 2, stress on solder joints, package pins 8, lead frame and overmolding material present on circuit board 2 can be detected. The resultant signal indicative of measured strain could be processed and used to take corrective action to reduce the strain applied to the circuit board 2. The circuit board 2 could further be rigidly attached to another structure at fastener openings 5 via bolts or other fasteners. The circuit board 2 further includes input/output (I/O) pads 7 for transmitting electrical signals.

While the strain gauge 10 is illustrated herein in connection with use for sensing strain on a printed circuit board 2, it should be appreciated that the strain gauge 10 may be used for various other applications. For example, strain gauge 10, with or without circuit board 2, may be mounted on a torsion bar of a known stiffness for a vehicle steer-by-wire application to detect steering torque applied to the steering wheel. According to a further example, the strain sensor 10 with or without circuit board 2 may be mounted to a brake pedal for a vehicle brake-by-wire application to detect force or torque applied to the brake pedal and generate a signal indicative of the applied force. The strain gauge 10 may be used in any of a number of applications to measure strain, such as compression and tension, and may further detect related parameters such as torque.

Figure 2:
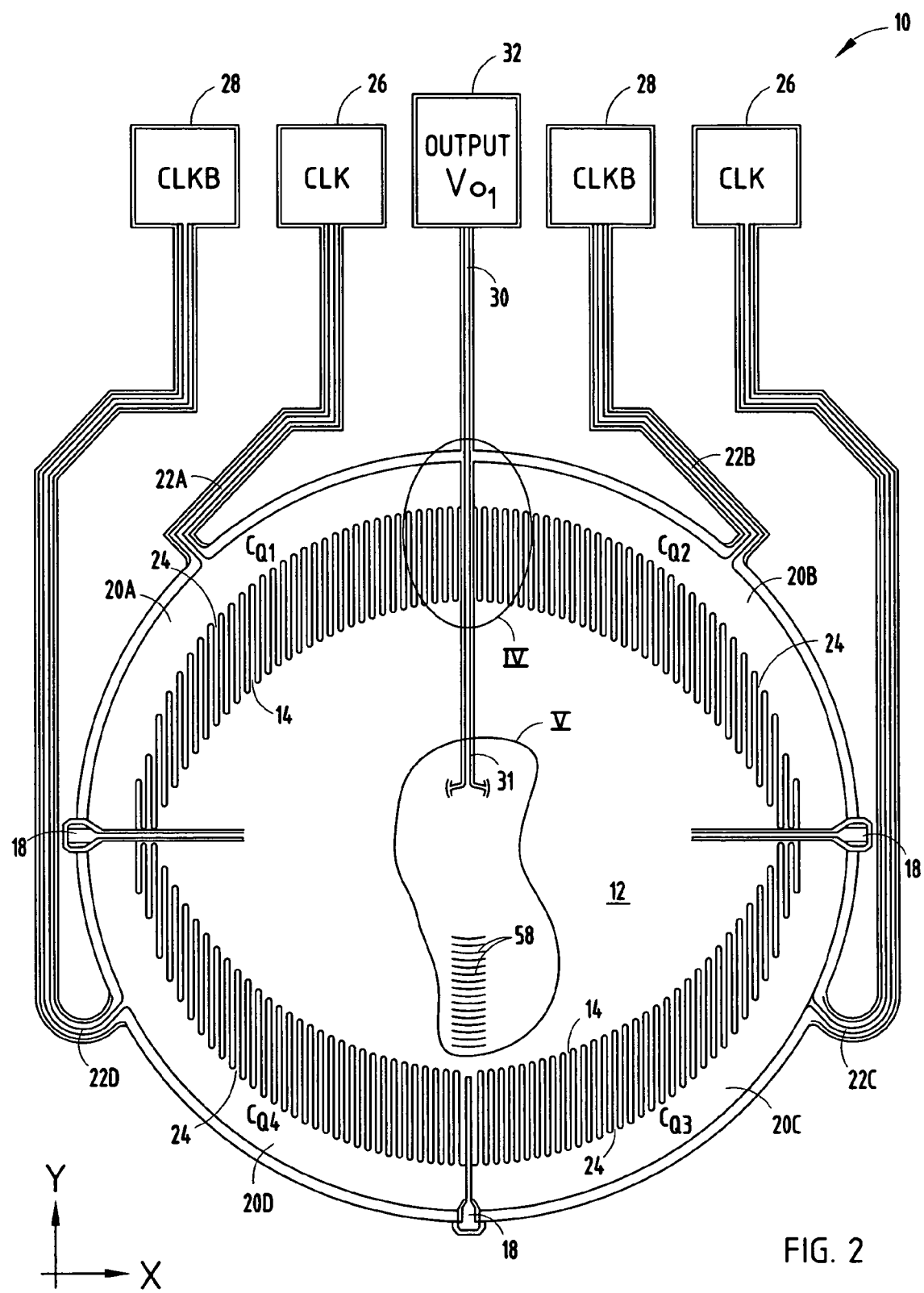
FIG. 2 is a top view of the strain gauge absent an overlying cover according to one embodiment of the present invention.
Figure 3:
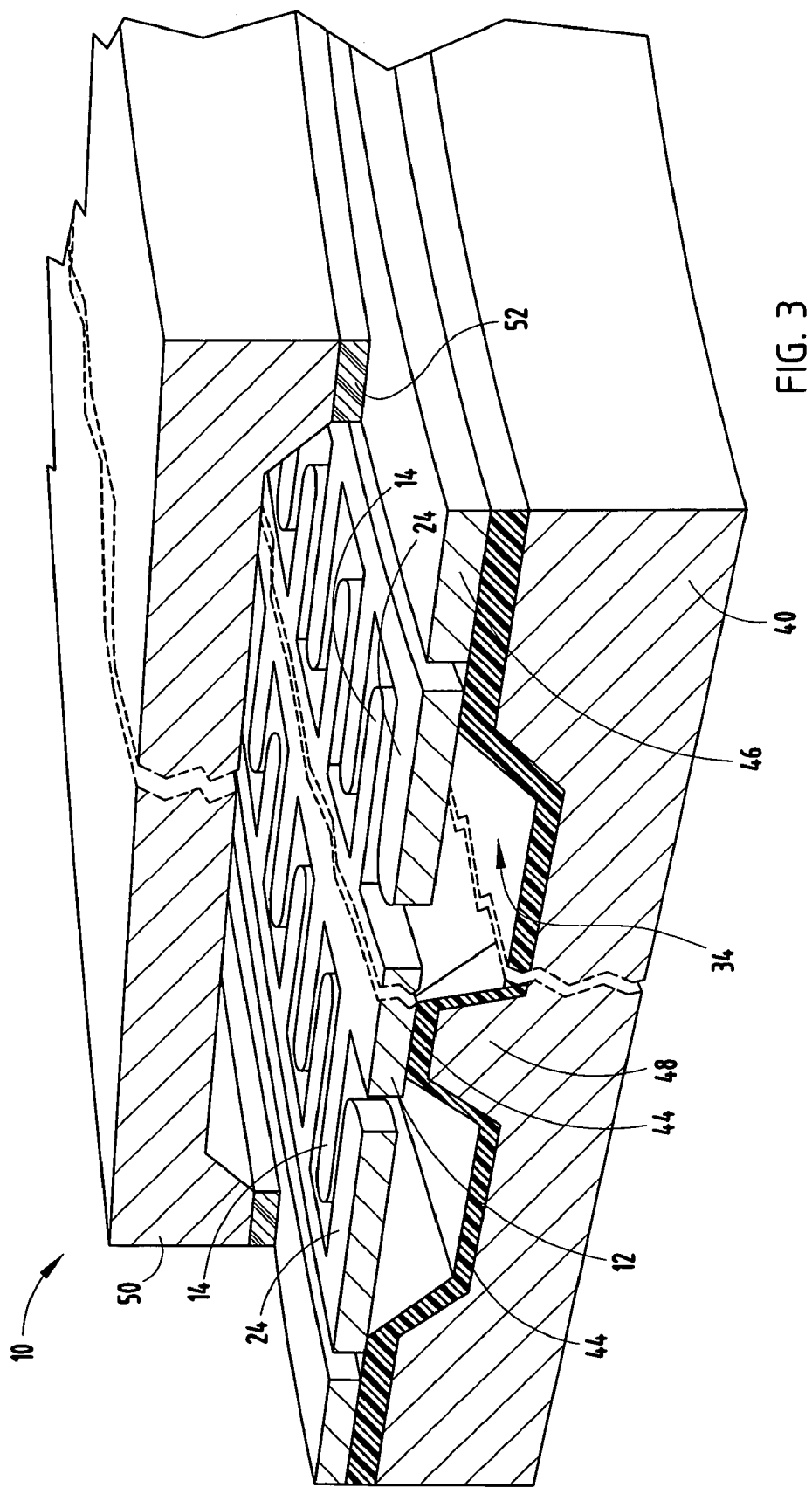
FIG. 3 is a partial cut away sectional view of a simplified version of the strain gauge absent the overlying cover.

Referring to FIGS. 2 and 3, the strain gauge 10 is illustrated according to a first embodiment for sensing components of strain at angle of forty-five degrees (45°) relative to both the X- and Y-axes. The strain gauge 10 is illustrated in FIG. 2 without the signal processing circuitry and without the overlying cover 50, which is shown in FIG. 3. The strain gauge 10 senses strain, including compressive forces and tensile forces, along a sensing axis that is oriented forty-five degrees (45°) relative to both the X- and Y-axes, while minimizing adverse effects of acceleration that the strain gauge 10 may also be subjected to. The strain gauge 10 is a micromachined device having a supporting structure which greatly minimizes sensitivity of the microsensor to structural asymmetries, fabrication processing, packaging, impulsive shocks due to handling. Additionally, the strain gauge 10 has high sensitivity due to high mechanical gain, and thus is less sensitive to noise interference such as electromagnetic interference (EMI).

The strain gauge 10 may be fabricated on a single-crystal silicon substrate 40 using a trench etching process, such as deep reactive ion etching (DRIE) and bond-etch back process. The etching process may include etching out a pattern from a doped material suspended over a cavity 34. One example of an etching process that may be used to form the strain gauge 10 of the present invention is disclosed in connection with linear accelerometers in U.S. Pat. No. 6,428,713, entitled "MEMS SENSOR STRUCTURE AND MICROFABRICATION PROCESS THEREFOR," and U.S. Pat. No. 6,761,070, entitled "MICROFABRICATED LINEAR ACCELEROMETER," the entire disclosures of which are incorporated herein by reference. While the strain gauge 10, as described herein, is fabricated on a single-crystal silicon substrate 40 using a trench etching process, it should be appreciated that the strain gauge 10 could be fabricated using other known fabrication techniques, such as: an etch and undercut process; a deposition, pattern, and etch process; and an etch and release process, without departing from the teachings of the present invention. In addition, a fabrication process could be used which integrates the signal processing electronics onto a single integrated circuit with the strain gauge such as a silicon on insulator (SOI) process.

The strain gauge 10 includes a fixed central electrode member 12, generally formed in the shape of a disk, according to one embodiment. The central electrode member 12 could be formed in the shape of a rectangle or other shape fixedly connected to substrate 40 via a stationary central pedestal (member) 48. The central electrode member 12 forms an opposing electrode and has a plurality of rigid comb-like conductive plates (fingers) 14 extending outward from the outer peripheral edge of the disk to serve as capacitive plates. The conductive fingers 14 are formed along an axis (e.g., Y-axis) perpendicular to the X-axis. The central electrode member 12 with comb-like conductive fingers 14 generally extends above a cavity 34 beyond the periphery of supporting pedestal 48. For purposes of discussion herein, the X-axis and Y-axis are defined as shown oriented in FIG. 2. According to other embodiments, the conductive plates 14 and 24 could be oriented in other axes, such as an axis perpendicular to both the X- and Y-axes.

According to the embodiment shown, the central electrode member 12 has a main central portion having a substantially elliptical shaped disk, with the conductive fingers 14 extending outward from the central portion and perpendicular to the X-axis. Accordingly, the plurality of conductive fingers 14 are arranged extending along the Y-axis. The length of the conductive fingers 14 may vary as shown, such that longer conductive fingers 14 are formed at the wider part of the central portion of the central electrode member 12, as compared to the narrower part of the central portion of central electrode member 12, to achieve a substantially round-shape for the overall configuration of the central electrode member 12 and the conductive fingers 14. Other size (length, diameter, etc.) and shapes of central electrode member 12 and its capacitive plates 14 may be employed.

The central support pedestal 48 rigidly supports the central electrode member 12 on substrate 40. The conductive plates 14 extending from central electrode member 12 are likewise thereby supported by central support pedestal 48. Support pedestal 48 is formed as part of the substrate 40 and is dielectrically isolated from electrode member 12 by the oxide layer 44, so that pedestal 48 is not part of the resulting capacitance in the embodiment shown.

Fixed to the thick oxide insulation layer 44 on top of substrate 40 are four fixed outer electrodes 20A–20D, each having a plurality of first capacitive plates (fingers) 24 interdisposed between adjacent second capacitive plates 14, to form four banks of variable capacitors $C_{Q1}$–$C_{Q4}$. The first outer electrode 20A has a clock input line 22A for receiving signal CLK 26, such as a square wave signal. The plurality of first capacitive plates 24 provided with the first outer electrode 20A are interdisposed between adjacent capacitive plates 14 of central electrode member 12 for approximately one-quarter rotation (i.e., a 90° arc) of central electrode member 12 to provide a first bank of capacitors identified by $C_{Q1}$. The second outer electrode 20B likewise has a plurality of comb-like capacitive plates 24 interdisposed between adjacent first capacitive plates 14 of central electrode member 12 for approximately a 90° arc to provide a second bank of capacitors identified by $C_{Q2}$. The second outer electrode 20B has a clock input 22B for receiving signal CLKB 28, such as a square wave signal. The third outer electrode 20C also includes a plurality of fixed comb-like capacitive plates 24 for approximately a 90° arc of second capacitive plates 14 of the central electrode member 12 to provide a third bank of capacitors identified by $C_{Q3}$, and likewise receives signal CLK 26 via input line 22C. The fourth outer electrode 20D has a plurality of capacitive plates 24 for approximately the remaining one-quarter of the first capacitive plates 14 of central electrode member 12, to provide a fourth bank of capacitors identified by $C_{Q4}$, and receives signal CLKB 28 via input line 22D. It should be appreciated that the number of electrodes, capacitive plates and resultant capacitor banks can be increased or decreased, without departing from the teachings of the present invention.

Each of the outer electrodes 20A–20D are formed near the outer perimeter of the central electrode member 12 extending through an arc length of approximately 90°. Adjacent outer electrodes 20A–20D are dielectrically isolated from one another via isolators 18. Each isolator 18 has one or more slots (trenches) that serve to provide a dielectric gap. The outer electrodes 20A–20D and corresponding plurality of capacitive plates 24 are fixed in place supported on top of insulation layer 44 and substrate 40. Accordingly, the outer peripheral capacitive plates 24 are able to move relative to second capacitive plates 14 and the central electrode member 12 in response to strain experienced on substrate 40 along the sensing axis.

The presence of strain on substrate 40 in the form of a compression causing force or tension causing force, will cause movement between the central electrode member 12 and its second capacitive plates 14 and one or more of outer electrodes 20A–20D and associated first capacitive plates 24. The resultant change in distance between certain capacitive plates 14 and 24 results in a change in the capacitance of one or more of capacitor banks $C_{Q1}$–$C_{Q4}$ and hence the resultant signal sensed via strain gauge 10 which is indicative of the strain applied to the substrate 40.

The central electrode member 12 and its associated second capacitive plates 14 are electrically conductive and electrically connected via an output line 30 to output pad 32 for providing an output voltage $V_{O1}$. The output voltage $V_{O1}$ has a voltage level indicative of the displacement of the central electrode member 12 and its capacitive plates 14 relative to outer electrodes 20A–20D and the corresponding capacitive plates 24 due to strain applied to substrate 40 in the sensing axis. Accordingly, by measuring the output voltage $V_{O1}$ at output pad 32, the strain gauge 10 provides an indication of the strain applied thereto.

With particular reference to the cross section shown in FIG. 3, the strain gauge 10 includes substrate 40 which serves as the underlying support structure. Substrate 40 may include a silicon or silicon-based substrate having the thick oxide insulation layer 44 formed on the top surface, and may further include a bottom oxide insulation layer (not shown) formed on the bottom surface. The substrate 40 may include silicon, or alternate materials such as glass or stainless steel. The substrate 40 and thick oxide insulation layer 44 are configured to provide a cavity 34 generally extending below central electrode member 12 and separating central electrode member 12 from outer electrodes 20A–20D. The cavity 34 may also extend above the central electrode member 12 and below the cover 50. Additionally, substrate 40 and oxide layer 44 form the underlying central pedestal 48 supporting central electrode member 12 for purposes of fixing the central electrode member 12 in place relative to substrate 40.

Formed above the substrate 40 and on top of insulation layer 44 is an epitaxial layer 46 made of conductive material, such as silicon. Alternately, layer 46 could be a polysilicon layer. Epitaxial layer 46 is made of a conductive material and is etched to form various components including the central electrode member 12, isolation trenches, gaps, and other elements that support or isolate conductive signal paths. Trenches and gaps provide physical and electrical isolation between adjacent elements. The epitaxial layer 46 may have a thickness in the range of three to two hundred micrometers (3–200 μm), and more particularly of approximately thirty micrometers (30 μm), according to one embodiment. The epitaxial layer 46 may include a field passivation layer (not shown) disposed on top thereof. A mechanical bond layer such as a glass frit layer 52 connects the cover 50 to the epitaxial layer 46. The conductive signal paths, outer electrodes 20A–20D, and output data line 30 are formed on top of the conductive epitaxial layer 46. Additionally, the overlying cover 50 is provided on the top to enclose the strain gauge 10 to prevent contamination and damage to the strain gauge 10.

Figure 4:
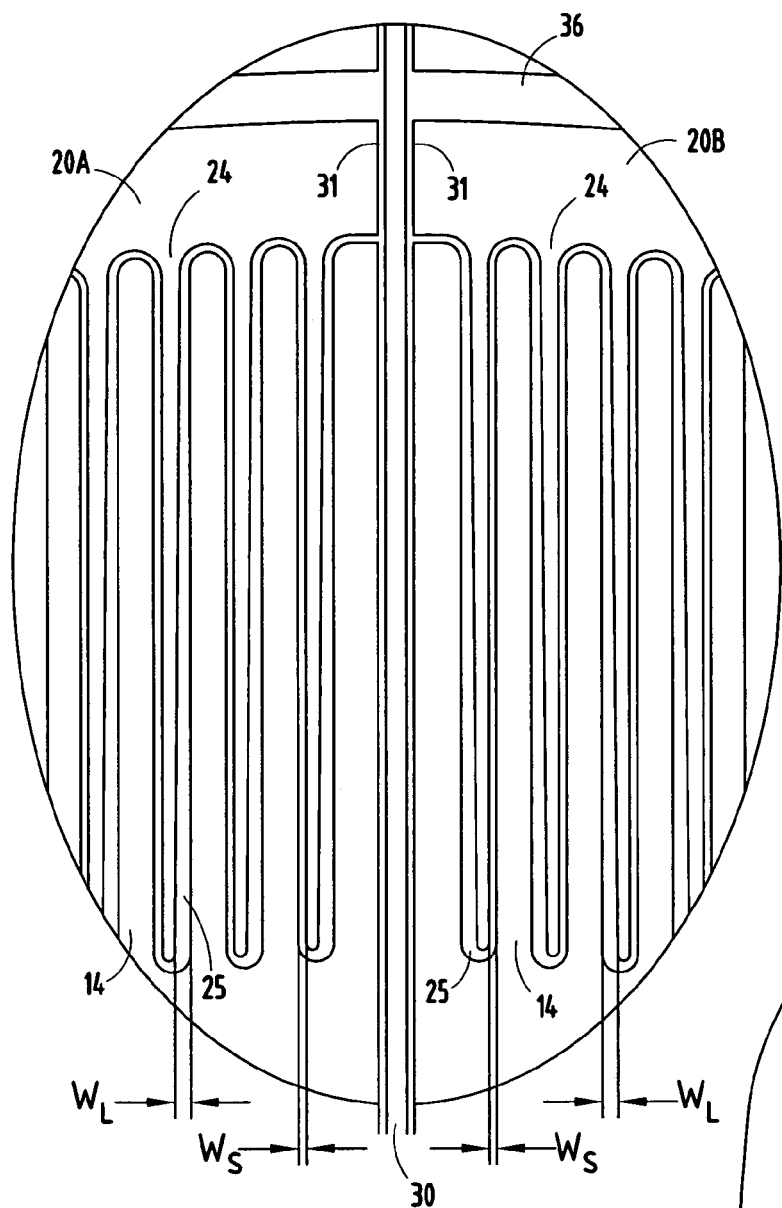
FIG. 4 is an enlarged view of section IV of the strain gauge shown in FIG. 2.

Referring to FIG. 4, a portion of the strain gauge 10 is illustrated in further detail. Data line 30 extends within a pair of generally parallel radial slots 31 extending along the Y-axis formed through the entire depth of central electrode member 12 to provide an electrical signal path between the central electrode member 12 and output pad 32. The slots 31 provide dielectric isolation between the data line 30 and central electrode member 12, as well as between adjacent outer electrodes 20A and 20B, while allowing movement between conductive plates 14 and 24 due to strain. Trenches 36 isolate the outer electrodes 20A–20D from the outer surrounding elements.

The first capacitive plates 24 are interdisposed between adjacent second capacitive plates 14 and separated from one another via gaps (slots) 25. Each gap 25 between capacitive plates 14 and 24 allows for capacitive plates 14 to move relative to capacitive plates 24 when subjected to strain. Each of the capacitive plates 14 are rigid to prevent movement relative to the central electrode member 12. Additionally, the capacitive plates 14 and 24 each have a thickness equal to the thickness of the epitaxial layer 46. Because the total change in capacitance is proportional to thickness of the capacitive plates 14 and 24, the signal-to-noise ratio is enhanced with enlarged thickness.

The gap 25 between capacitive plates 14 and 24 is greater on one side of plate 14 as compared to the opposite side. For example, with respect to the bank of capacitors $C_{Q2}$ formed by outer electrode 20B, the width $W_L$ of gap 25 between adjacent capacitive plates 14 and 24 is approximately twice the width $W_S$. The gap 25 between adjacent pairs of capacitive plates 14 and 24 is configured substantially the same for each of the capacitive plates connected to the same outer electrode. However, for adjacent outer electrodes 20A and 20B, the orientation of the conductive plates 14 and 24 is switched such that the larger air gap width $W_L$ and smaller gap width $W_S$ of gap 25 is on the opposite side as compared to the adjacent outer electrode. For example, the capacitive plates 24 on outer electrode 20A are separated from capacitive plates 14 by an air gap 25 of width $W_L$ twice as wide on the left side of capacitive plates 14 as the width $W_S$ on the right side of capacitive plates 14, while outer electrode 20B is configured with a larger gap width $W_L$ on the right side of plate 14 as compared to its left side. Additionally, motion stop beads (not shown) can be formed on either of both of the capacitive plates 14 and 24 for limiting the relative movement between capacitive plates 14 and 24, in the event excessive strain is experienced. The motion stop beads also reduce the likelihood that the capacitive plates will stick together if they touch each other due to excessive strain.

The strain gauge 10 shown and described herein has four banks of variable capacitors $C_{Q1}$–$C_{Q4}$ formed by capacitive plates 14 and 24. The capacitive plates 14 and 24 are associated with the first outer electrode 20A are a mirror image of the capacitive plates 14 and 24 associated with the second outer electrode 20B. Likewise, the arrangement of the capacitive plates 14 and 24 associated with third outer electrode 20C is a mirror image of the capacitive plates 14 and 24 associated with fourth outer electrode 20D. The capacitive plates 24 associated with outer electrodes 20A and 20C have a certain positive-to-negative orientation with respect to the capacitive plates 14. In contrast, the positive-to-negative orientation between capacitive plates 14 and 24 associated with the outer electrodes 20B and 20D are arranged oppositely. By alternating the orientation of the four banks of capacitors $C_{Q1}$–$C_{Q4}$ in the four quadrants as disclosed, the strain gauge 10 of the present invention essentially nulls out rotational and linear acceleration sensitivities and allows strain to be sensed in the sensing axis. Further, by employing a plurality of capacitive plates 24 commonly connected to outer electrodes 20A–20D, a reduced number of signal input and output lines may be employed.

Figure 5:
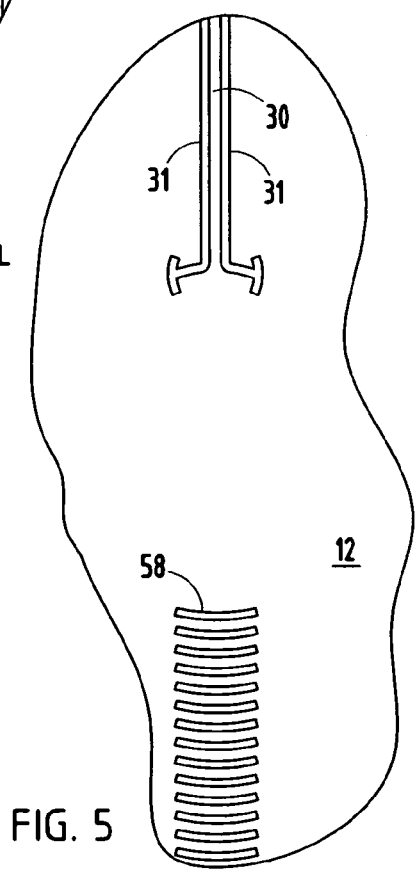
FIG. 5 is an enlarged view of central section V of the strain gauge shown in FIG. 2.

Referring to FIG. 5, an enlarged central portion of the strain gauge 10 is illustrated therein in greater detail. The central region of central electrode member 12 is shown connected to data line 30 and isolated via slots 31. The presence of slots 31 creates a mechanical imbalance in the overall central electrode member 12. This imbalance would result in an undesired torque on the central support member 48 caused by a large linear acceleration. To compensate for this imbalance, a plurality of slots 58 are formed in the lower region of the central electrode member 12 such that the central electrode member 12 is symmetrically balanced about its center point. By balancing central electrode member 12, the strain gauge 12 is less sensitive to accelerations.

Figure 6:
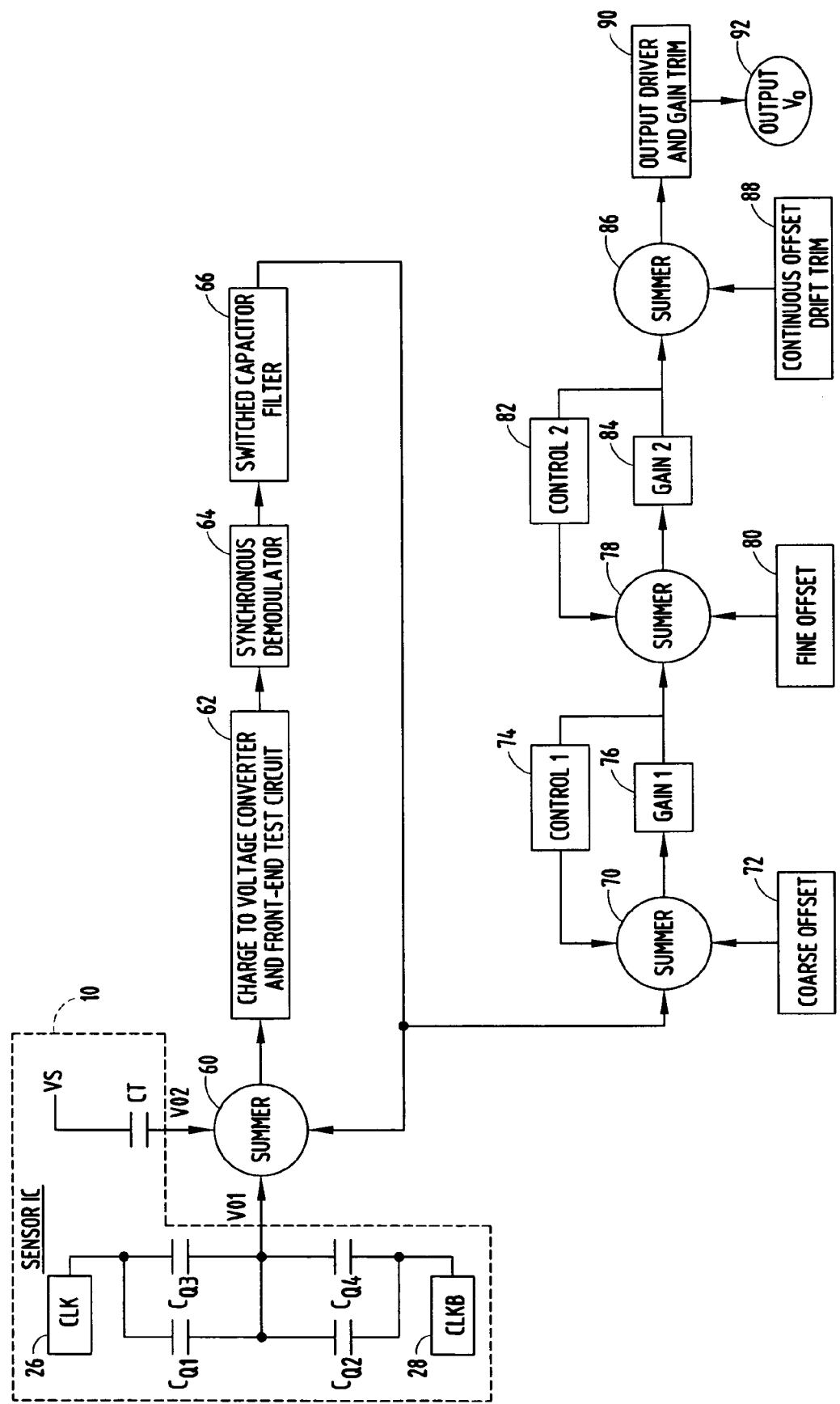
FIG. 6 is a block/circuit diagram illustrating processing integrated circuitry coupled to the strain gauge.

Referring to FIG. 6, the processing of the signals applied to and sensed with the strain gauge 10 is illustrated with signal conditioning integrated circuitry (IC), according to one embodiment. The four banks of capacitors $C_{Q1}$–$C_{Q4}$ are generally shown receiving clock signal CLK at input pad 26 and signal CLKB at input pad 28. Clock signals CLK and CLKB may be rectangular, (e.g., square) wave-generated signals that have alternating voltage levels of $V_S$ and zero volts (ground) or positive and negative voltages $+V_S$ and $-V_S$. Clock signal CLKB is one hundred eighty degrees (180°) out of phase, i.e., inverse as compared to clock signal CLK and therefore provides an opposite phase rectangular waveform.

The integrated circuitry may be implemented as a CMOS device. Included in the integrated circuitry is a summer 60 for receiving the output voltage $V_{O1}$ on output pad 32 and a voltage $V_{O2}$ received from capacitor CT, when a voltage source $V_S$ is applied thereto. Capacitor CT is a capacitor on-chip that is approximately equal to the summation of the capacitance of capacitors $C_{Q1}$–$C_{Q4}$. Voltage $V_{O2}$ contains noise present in the sensed signal, and summer 60 subtracts the noise from the output voltage $V_{O1}$. The voltage $V_{O1}$ represents the sensed output line voltage and voltage $V_{O2}$ represents an impedance matching line. The impedance matching creates a pseudo-differential input-output that improves the immunity to electromagnetic interference (EMI) and other common mode signals. Voltage $V_{O2}$ is therefore employed to reduce electromagnetic interference.

The output of summer 60 is applied to a charge-to-voltage converter and front-end test circuit 62 which converts the processed charge signal to a converted voltage signal. The voltage signal is then input to a synchronous demodulator 64 which demodulates the voltage signal. The demodulated voltage signal is further processed by a switched capacitor filter 66.

The output of the switched capacitor filter 66 is further applied to a summer 70 which sums the signal with a coarse offset 72 and a feedback signal from a block 74 labelled control 1. The output of summer 70 is applied to a gain 1 block 76. During sensor calibration, undesired offset of the filtered and demodulated signal is removed by the coarse offset block 72 and the signal is amplified by the gain 1 block 76.

The output of gain 1 block 76 is further applied to a summer 78 which sums the signal with a fine offset 80 and a second feedback signal from block 82 labeled control 2. The output of summer 78 is applied to a gain 2 block 84. Undesired offset of the gain 1 block 76 output signal is removed by the fine offset block 80 and the signal is further amplified by the gain 2 block 84. These automatic offset-adjustment blocks advantageously result in a high-speed, automated calibration procedure. Under normal operating conditions, little or no offset cancellation should occur, giving the device a true DC response.

For special applications that do not require a DC response, the device may be calibrated to provide a slow, continuous offset nulling using a continuous offset drift trim block 88. This includes applying the output of gain block 84 to a summer 86 which sums the signal with the continuous offset drift trim signal 88 to account for drift error. The output of summer 86 is applied to an output driver and gain trim block 90 to generate the output signal $V_O$ at block 92. The output driver and gain trim block 90 may provide a one milliamp output current drive capability, according to one example, and may be used to calibrate the desired sensing range of the strain gauge to within one percent accuracy.

The strain gauge may then be calibrated to provide a sensing range as desired, for example between ±0.2° and ±3.0° of board twist for a torque application. The coarse, fine offset and gain trims may be performed during testing of the module following its initial manufacture or at a later time frame. It should be appreciated that the output signal 92 may be further processed via control circuitry, such as a microprocessor-based controller, to perform various control functions or to provide other variations of the sensed strain, such as to calculate torque or other strain related parameters.

In operation, the strain gauge 10 of the present invention provides a measurement of the strain along a sensing axis that is 45° relative to both the X- and Y-axes, according to a first embodiment. This measurement also provides magnitude of the sum of the strains along both the X- and Y-axes. The strain vector along the X- and Y-axes could further be determined if two or more strain gauge sensors are employed.

Figure 7A:
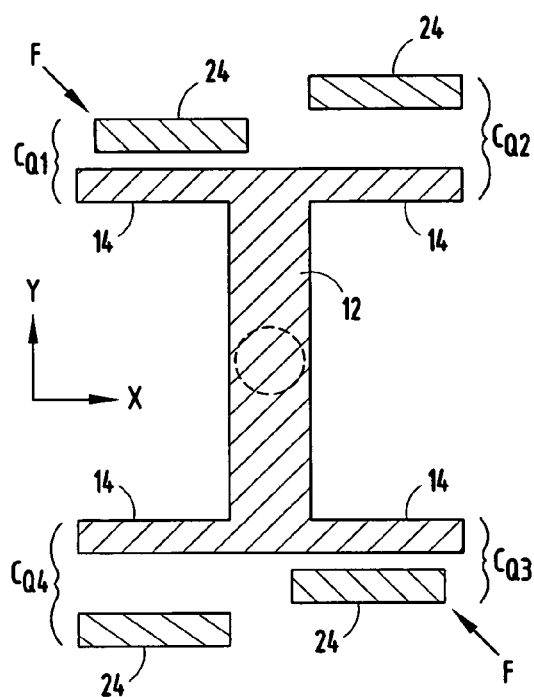
FIG. 7A is an exemplary view of a simplified strain gauge under compression force "F" according to a first embodiment.
Figure 7B:
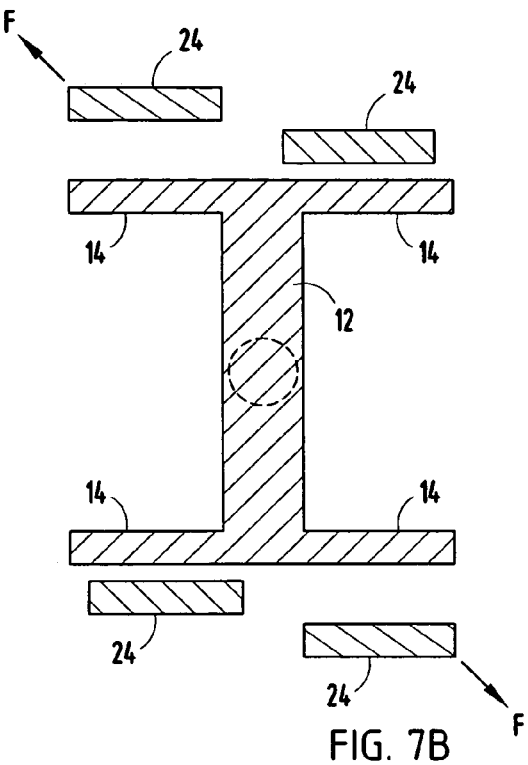
FIG. 7B is an exemplary view of the simplified strain gauge under tension force "F" according to the first embodiment.
Figure 8A:
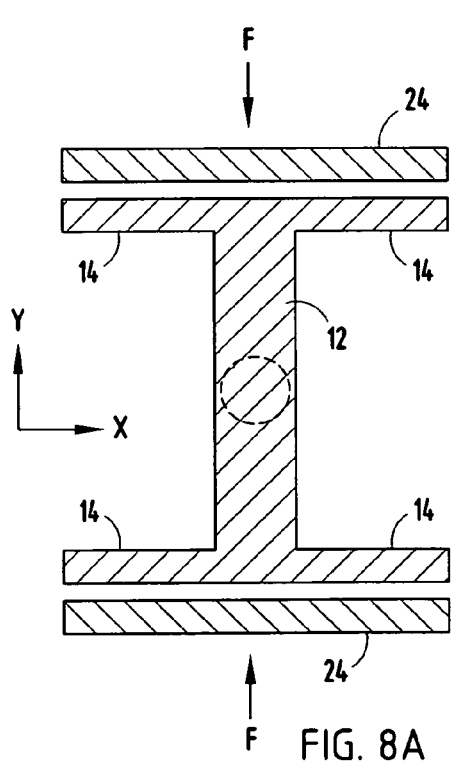
FIG. 8A is an exemplary view of a simplified strain gauge under compression force "F" according to a second embodiment.
Figure 8B:
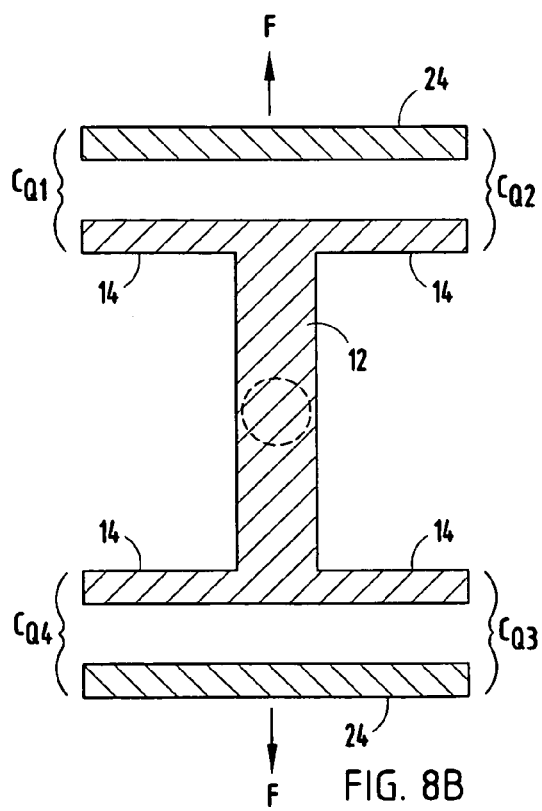
FIG. 8B is an exemplary view of a simplified strain gauge under tension force "F" according to the second embodiment.

To help to explain operation of the strain gauge 10, reference is made to the simplified examples of the strain gauge sensor shown in FIGS. 7A and 7B, according to one embodiment and the strain gauge sensor shown in FIGS. 8A and 8B according to a second embodiment. Referring to FIG. 7A, strain is applied as a compressive force along the sensing axis at a 45° angle relative to both the X- and Y-axes, such that the distance between capacitive plates 14 and 24 for capacitor banks $C_{Q1}$ and $C_{Q3}$ are forced closer together. Similarly, a tensive force is illustrated in FIG. 7B in which the same capacitive plates 14 and 24 for capacitor banks $C_{Q1}$ and $C_{Q3}$ are pulled further apart from each other to generate an opposite strain event. In the example shown in FIGS. 7A and 7B, the strain gauge 10 senses the strain, positive or negative, and is able to provide a strain gauge measurement along the sensing axis.

In FIGS. 8A and 8B, the strain gauge 10 illustrated detects strain along a sensing axis oriented in the Y-axis only. In the example shown in FIG. 8A, a force F creates a compressive force which causes the capacitive plates 14 and 24 to move closer to each other thereby increasing capacitance of capacitor banks $C_{Q1}$–$C_{Q4}$ by an amount indicative of the compressive strain. To the contrary, force F applied as a tension is illustrated in FIG. 8B which causes the capacitive plates 14 and 24 to move further apart from each other to decrease capacitance of capacitor banks $C_{Q1}$–$C_{Q4}$ in response to the tensive force strain.

Figure 9:
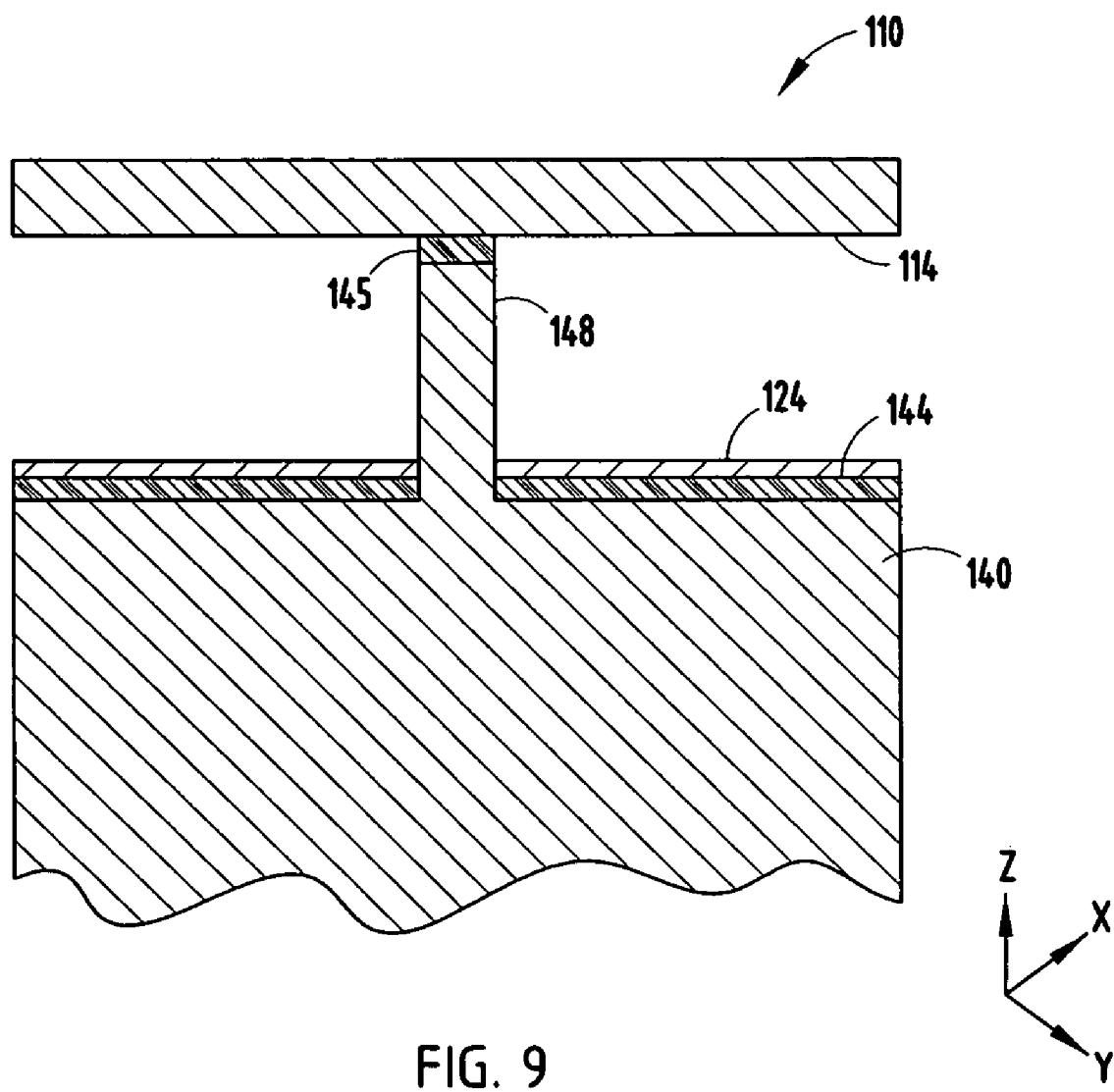
FIG. 9 is a cross-sectional view of a strain gauge for sensing strain in the Z-axis according to a further embodiment.

While the strain gauge 10 is shown and described herein in accordance with embodiments which sense strain in a sensing axis oriented at 45° relative to the X- and Y-axes, according to one embodiment, and along the Y-axis according to a second embodiment, it should be appreciated that the strain gauge 10 may be configured to sense strain along other axes, such as the X-axis, and a Z-axis that is perpendicular to the both the X- and Y-axes. One example of a strain gauge 110 for sensing strain along the Z-axis is illustrated in FIG. 9, according to a further embodiment. Strain gauge 110 includes an underlying substrate 140 having a lower electrode with conductive capacitive plates 124 supported thereon via a dielectric medium 144, such as an oxide layer. The conductive capacitive plates 124 are thereby dielectrically isolated from substrate 140. Conductive capacitive plates 124 serve as capacitive plates and are further coupled to electrical circuitry to receive one or more inputs or provide an output signal.

The strain gauge 110 further includes an upper electrode with capacitive plates 114 in spaced relationship relative to capacitive plates 124. Upper electrode capacitive plates 114 are formed by an epitaxial layer that is bonded to oxide layer 145. Oxide layer 145 is a dielectric medium that electrically isolates the upper electrode capacitive plates 114 from the substrate 140. Oxide layer 145 is provided on pedestal 148 which is part of substrate 140. Upper electrode plates 114 are connected to either an output or input.

In operation, strain gauge 110 senses strain applied along the Z-axis. Strain applied to the substrate 140 in the Z-axis changes the distance between capacitive plates 114 and 124. The change in distance between capacitive plates 114 and 124 generates a change in the capacitance between capacitive plates 114 and 124 which generate a voltage signal indicative of the change in capacitance and, hence, the sensed strain along the Z-axis.

Accordingly, the strain gauge 10 of the present invention advantageously measures strain applied to a substrate as a function of change in capacitance between capacitive plates that are attached to electrodes fixed to the substrate. The strain gauge 10 may include one or more pairs of electrodes each having one or more capacitive plates that move relative to each other responsive to strain applied to the substrate. The strain gauge 10 is well suited for use in sensing strain in various other applications.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A strain gauge comprising:
   a support substrate;
   a first electrode supported on the substrate and comprising one or more first capacitive plates;
   a second electrode supported on the substrate and comprising one or more second capacitive plates arranged to provide a capacitive coupling with the first capacitive plates, said one or more second capacitive plates being movable relative to the one or more first capacitive plates in response to strain in the substrate between the first and second electrodes, wherein the first and second electrodes are connected to the substrate and the first and second capacitive plates substantially extend over a cavity, wherein the first electrode comprises a first plurality of capacitive plates and the second electrode comprises a second plurality of capacitive plates;
   an input electrically coupled to one of the first and second electrodes for receiving an input signal; and
   an output electrically coupled to the other of the first and second electrodes for providing an output signal which varies as a function of the capacitive coupling and is indicative of the strain.

2. The strain gauge as defined in claim 1, wherein the second electrode is substantially centrally located and the first electrode is radially displaced from the second electrode.

3. The strain gauge as defined in claim 1, wherein the first and second plurality of capacitive plates are interdigitated.

4. The strain gauge as defined in claim 1, wherein the support substrate comprises a silicon substrate.

5. The strain gauge as defined in claim 1, wherein said strain gauge is fabricated by a trench etching process.

6. The strain gauge as defined in claim 1 further comprising integrated electronics circuitry for processing and compensating the output signal.

7. The strain gauge as defined in claim 1, wherein the first and second capacitive plates are substantially parallel to each other, and wherein a force is applied to the substrate which results in a strain which causes movement of the first capacitive plates relative to the second capacitive plates.

8. A strain gauge comprising:
   a support substrate;
   a first electrode supported on the substrate and comprising one or more first capacitive plates;
   a second electrode supported on the substrate and comprising one or more second capacitive plates arranged to provide a capacitive coupling with the first capacitive plates, said one or more second capacitive plates being movable relative to the one or more first capacitive plates in response to strain in the substrate between the first and second electrodes, wherein the first and second electrodes are connected to the substrate and the first and second capacitive plates substantially extend over a cavity, wherein the first electrode comprises a pair of opposing outer electrodes each having a plurality of first capacitive plates;
   an input electrically coupled to one of the first and second electrodes for receiving an input signal; and
   an output electrically coupled to the other of the first and second electrodes for providing an output signal which varies as a function of the capacitive coupling and is indicative of the strain.

9. A strain gauge comprising:
   a support substrate;
   a first outer electrode supported on the substrate and comprising a plurality of first capacitive plates;
   an inner electrode supported on the substrate and comprising a plurality of second capacitive plates arranged to provide a capacitive coupling with the plurality of first capacitive plates, said second capacitive plates being movable relative to the first capacitive plates in response to strain in the substrate between the first outer and inner electrodes, wherein the first outer and inner electrodes are connected to the substrate and the first and second capacitive plates substantially extend over a cavity;

a second outer electrode supported on the substrate and comprising a third plurality of capacitive plates;

an input electrically coupled to one of the first outer and the inner electrodes for receiving an input signal; and an output electrically coupled to the other of the first outer and the inner electrodes for providing an output signal which varies as a function of the capacitive coupling and is indicative of the strain.

10. The strain gauge as defined in claim 9, wherein the first and second outer electrodes and the inner electrode are connected to the substrate and the first, second, and third plurality of capacitive plates substantially extend over the cavity.

11. The strain gauge as defined in claim 9, wherein the inner electrode is substantially centrally located and the first and second outer electrodes are radially displaced from the inner electrode.

12. A strain gauge comprising:

a support substrate:

a first outer electrode supported on the substrate and comprising a plurality of first capacitive plates;

an inner electrode supported on the substrate and comprising a plurality of second capacitive plates arranged to provide a capacitive coupling with the plurality of first capacitive plates, said second capacitive plates being movable relative to the first capacitive plates in response to strain in the substrate between the first outer and inner electrodes, wherein the first outer and inner electrodes are connected to the substrate and the first arid second capacitive plates substantially extend over a cavity, wherein the first outer electrode comprises a first plurality of capacitive plates and the inner electrode comprises a second plurality of capacitive plates;

an input electrically coupled to one of the first outer and the inner electrodes for receiving an input signal; and an output electrically coupled to the other of the first outer and the inner electrodes for providing an output signal which varies as a function of the capacitive coupling and is indicative of the strain.

13. The strain gauge as defined in claim 12, wherein the first and second plurality of capacitive plates are interdigitated.

14. The strain gauge as defined in claim 9, wherein the support substrate comprises a silicon substrate.

15. The strain gauge as defined in claim 9, wherein said strain gauge is fabricated by a trench etching process.

16. The strain gauge as defined in claim 9, wherein the first and second outer electrodes comprise a pair of opposing electrodes each having a plurality of first capacitive plates.

17. The strain gauge as defined in claim 9 further comprising integrated electronics circuitry for processing and compensating the output signal.

18. The strain gauge as defined in claim 9, wherein the inner electrode is supported on the substrate at a location that is substantially at the center of the inner electrode.

* * * * *